(12) United States Patent
Basek

(10) Patent No.: US 7,347,276 B2
(45) Date of Patent: Mar. 25, 2008

(54) ADJUSTABLE GARDEN TOOL

(75) Inventor: Charles Basek, Oakville (CA)

(73) Assignee: TCI97 Inc., Mississauga (CA)

( * ) Notice: Subject to any disclaimer, the term of this patent is extended or adjusted under 35 U.S.C. 154(b) by 0 days.

(21) Appl. No.: 10/922,904

(22) Filed: Aug. 23, 2004

(65) Prior Publication Data

US 2006/0037765 A1 Feb. 23, 2006

(51) Int. Cl.
*A01B 13/00* (2006.01)

(52) U.S. Cl. .......................... 172/25; 172/378; 294/57; D8/303; 16/444

(58) Field of Classification Search ............... 172/378, 172/371, 372, 374, 375, 25; 16/436, 430, 16/444, 111.1; 294/49–60, 57; D8/6, 10, D8/300, 303, 315, 321; 7/167; 74/543
See application file for complete search history.

(56) References Cited

U.S. PATENT DOCUMENTS

| | | | |
|---|---|---|---|
| 256,039 A | 4/1882 | Peters | |
| 342,516 A | 5/1886 | Iwan et al. | |
| 375,556 A | 12/1887 | Madden | |
| 488,918 A | 12/1892 | Clark | |
| 719,723 A | 2/1903 | Beebe | |
| 722,028 A | 3/1903 | Lubin | |
| 725,768 A | 4/1903 | Prevost | |
| 809,476 A | 1/1906 | Thaver | |
| 840,903 A | 1/1907 | Bucknail | |
| 933,227 A | 9/1909 | Billau | |
| 1,039,012 A | 9/1912 | Behrendt et al. | |
| 1,065,456 A | 6/1913 | Lowrey | |
| 1,323,680 A * | 12/1919 | Davidson | 74/557 |
| 1,411,435 A * | 4/1922 | Hosmer | 172/611 |
| 1,456,153 A * | 5/1923 | Seeger | 175/403 |
| 1,647,832 A | 11/1927 | Kovar | |

(Continued)

FOREIGN PATENT DOCUMENTS

CA 1290969 10/1991

(Continued)

*Primary Examiner*—Thomas B. Will
*Assistant Examiner*—Jamie L McGowan

(57) ABSTRACT

A manual garden tool having an elongate shaft with an actuator rotatably mounted at its lower end, tine(s) mounted to the actuator, and a cam surface at the lower end of the shaft in contact with a surface of each tine such that, as the actuator is rotated between the first and second positions, the upper portion of each tine rotates with respect to the actuator and the lower portion of the tine moves between extended and contracted positions. The actuator and tines are locked against rotation when the tines are in either position, with the tines being locked against movement by being seated in troughs of a stop plate. The actuator and tines can be unlocked and moved up the shaft to provide clearance past seat walls for the tines to move between the extended and contracted positions. A molded a plastic handle is also provided. The handle can be secured at the upper end of the shaft of a manual garden tool. The handle includes first and second hand grips spaced radially from the shaft and the handle can be secured to the shaft such that axial or rotational forces applied to the handle are transferred through a rigid support secured at the upper end of the shaft and which extends radially outwardly of the shaft thereof such that the forces are distributed radially outwardly across the length and width of the support.

9 Claims, 18 Drawing Sheets

U.S. PATENT DOCUMENTS

| | | | |
|---|---|---|---|
| 1,692,436 A * | 11/1928 | Deane | 111/101 |
| 1,797,101 A | 3/1931 | Ray | |
| 2,018,279 A | 10/1935 | Norcross et al. | |
| 2,030,770 A | 2/1936 | Smith | |
| 2,082,476 A | 1/1937 | Allen | |
| 2,087,671 A | 7/1937 | Knights | |
| 2,228,275 A | 1/1941 | William | |
| 2,403,041 A * | 7/1946 | Jacob | 173/140 |
| 2,531,297 A | 11/1950 | Rose | |
| 2,680,643 A | 6/1954 | Cravotta | |
| 2,686,690 A | 8/1954 | Kushnir | |
| 2,755,718 A | 7/1956 | Arndt | |
| 2,791,879 A | 5/1957 | Truran | |
| 2,855,668 A * | 10/1958 | Ottenad et al. | 30/276 |
| 2,991,838 A | 7/1961 | Lane | |
| 3,123,391 A | 3/1964 | Novak | |
| 3,129,771 A | 4/1964 | Lidstone | |
| 3,136,372 A | 6/1964 | Roach | |
| 3,198,719 A | 8/1965 | Stewart | |
| 3,273,930 A | 9/1966 | Gottfried | |
| 3,291,231 A | 12/1966 | Kammer | |
| 3,326,299 A * | 6/1967 | Foo | 172/13 |
| 3,333,881 A | 8/1967 | Hollinger | |
| 3,443,830 A | 5/1969 | Jones | |
| 3,444,938 A | 5/1969 | Ballmann | |
| 3,463,244 A | 8/1969 | McFadden | |
| T875,019 I4 * | 6/1970 | Haddad | 74/552 |
| 3,561,540 A | 2/1971 | Kaszkurewicz | |
| 3,567,264 A | 3/1971 | Baber | |
| 3,602,542 A | 8/1971 | Disston | |
| 3,767,251 A | 10/1973 | San Filipo | |
| 3,847,227 A | 11/1974 | Myers | |
| 3,960,218 A | 6/1976 | Atchley et al. | |
| 3,981,043 A * | 9/1976 | Curry | 16/430 |
| D253,390 S | 11/1979 | Bartholomew | |
| 4,232,422 A | 11/1980 | Fellmann | |
| 4,280,727 A * | 7/1981 | Germain | 294/54.5 |
| 4,333,198 A | 6/1982 | Vosbikian | |
| 4,437,523 A | 3/1984 | Isbell | |
| D274,117 S | 6/1984 | Lapps | |
| D274,687 S | 7/1984 | Hass | |
| 4,603,744 A | 8/1986 | Ramirez | |
| 4,618,003 A | 10/1986 | Hostetter | |
| 4,641,712 A | 2/1987 | Cravotta | |
| 4,723,802 A | 2/1988 | Fambrough | |
| 4,819,735 A | 4/1989 | Puckett | |
| 4,832,132 A | 5/1989 | Barcelon | |
| 4,865,372 A * | 9/1989 | Gabriel | 294/49 |
| 4,884,638 A | 12/1989 | Hoffman | |
| D305,604 S | 1/1990 | Keblbek | |
| D306,247 S | 2/1990 | Shields | |
| 4,904,010 A * | 2/1990 | Lacey et al. | 294/19.1 |
| 4,905,768 A | 3/1990 | Lorenz | |
| 4,932,339 A | 6/1990 | List | |
| 4,966,238 A | 10/1990 | Shields | |
| 4,983,281 A | 1/1991 | Montelione | |
| D314,500 S | 2/1991 | Germain | |
| 5,005,888 A | 4/1991 | Parks et al. | |
| 5,013,193 A | 5/1991 | Rabo et al. | |
| D322,918 S | 1/1992 | Parks et al. | |
| 5,207,466 A * | 5/1993 | Ohlson | 294/61 |
| 5,209,534 A * | 5/1993 | Crenshaw et al. | 294/50.6 |
| 5,242,024 A | 9/1993 | Van Houten | |
| 5,261,496 A | 11/1993 | Smotherman | |
| D347,980 S | 6/1994 | Butch | |
| 5,338,078 A * | 8/1994 | Basek | 294/50.5 |
| 5,411,101 A * | 5/1995 | Bonavitacola | 172/378 |
| 5,435,396 A | 7/1995 | Robichaux | |
| 5,452,767 A | 9/1995 | Smotherman | |
| 5,467,830 A | 11/1995 | Watson | |
| 5,469,923 A | 11/1995 | Visser | |
| D376,077 S | 12/1996 | Basek | |
| 5,609,215 A | 3/1997 | Rios et al. | |
| D381,246 S | 7/1997 | Basek | |
| 5,706,900 A | 1/1998 | Liao | |
| 5,716,132 A | 2/1998 | Chou | |
| 5,799,996 A * | 9/1998 | Fredrickson | 294/51 |
| 5,810,093 A | 9/1998 | Howard | |
| 5,819,856 A | 10/1998 | Meyer | |
| 5,826,930 A * | 10/1998 | Whitehead et al. | 294/54.5 |
| D406,219 S | 3/1999 | Basek | |
| 5,890,259 A * | 4/1999 | Sarac | 16/422 |
| 5,909,778 A | 6/1999 | Acosta et al. | |
| 5,988,292 A | 11/1999 | Knotts | |
| D417,382 S | 12/1999 | Saladino, Jr. | |
| 6,016,876 A | 1/2000 | Rountree et al. | |
| 6,062,992 A | 5/2000 | Hoyt et al. | |
| 6,076,614 A | 6/2000 | Gracy | |
| 6,131,972 A * | 10/2000 | Whitehead et al. | 294/57 |
| 6,227,317 B1 | 5/2001 | Severns | |
| 6,233,851 B1 | 5/2001 | Alexander et al. | |
| 6,257,346 B1 * | 7/2001 | Schofield et al. | 172/381 |
| 6,311,782 B1 | 11/2001 | Plasek et al. | |
| 6,352,122 B1 * | 3/2002 | Love | 172/371 |
| 6,367,236 B1 | 4/2002 | Marcone | |
| 6,374,758 B1 * | 4/2002 | Mickle et al. | 111/106 |
| 6,418,585 B1 | 7/2002 | Viner | |
| 6,467,551 B1 | 10/2002 | Washek | |
| 6,536,535 B1 | 3/2003 | Washek | |
| D481,917 S | 11/2003 | McLean | |
| 2001/0037886 A1 * | 11/2001 | Johnson | 172/377 |
| 2003/0230420 A1 | 12/2003 | Brown | |

FOREIGN PATENT DOCUMENTS

| | | |
|---|---|---|
| CH | 137681 | 4/1930 |
| CH | 179360 | 11/1935 |
| DE | 295 19 423 U | 2/1996 |
| FR | 2613578 A1 | 10/1988 |
| GB | 865902 | 4/1961 |
| GB | 1 178 615 A | 1/1970 |
| GB | 2188523 | 10/1987 |
| WO | WO-90/06672 | 6/1990 |

* cited by examiner

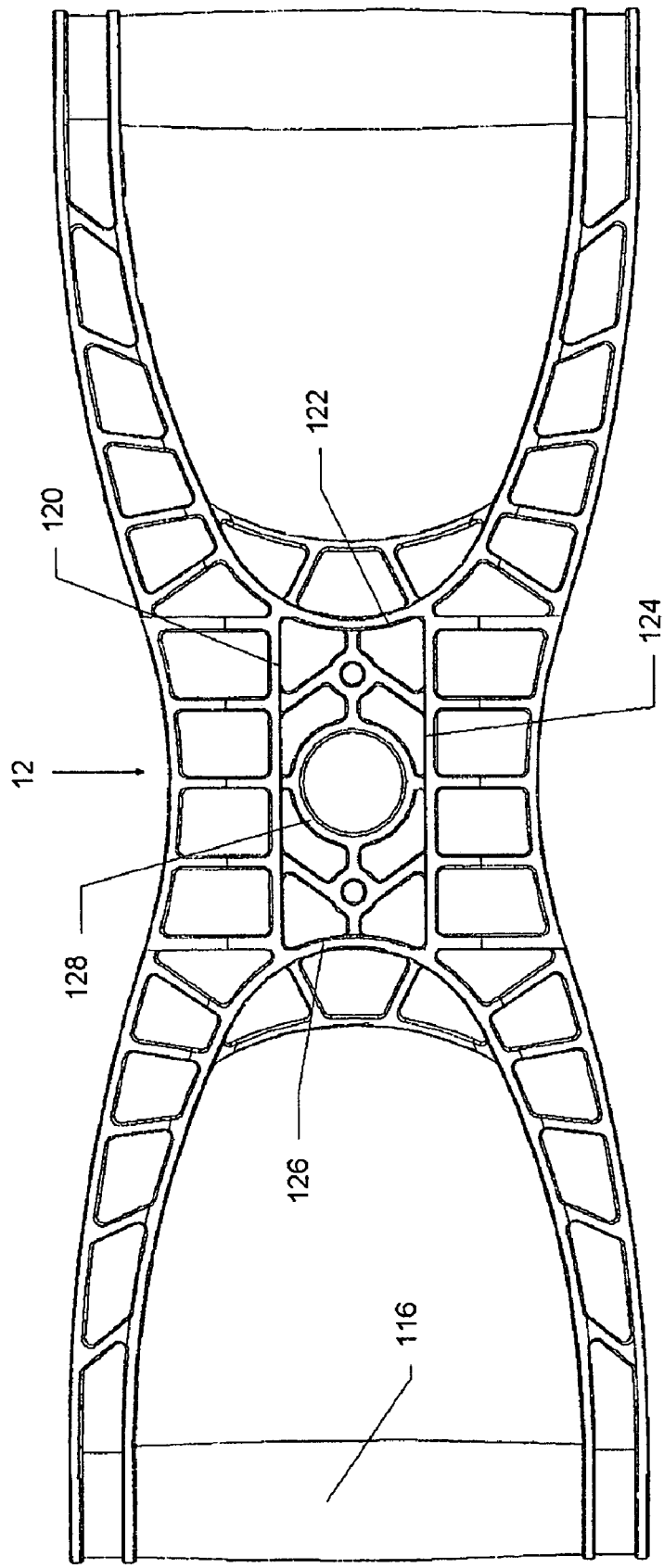

ADJUSTABLE GARDEN TOOL

FIELD OF THE INVENTION

This invention is in the field of manual garden implements having a ground-engaging working end, adjustable at the user's option. The implement can include a molded, e.g., plastic handle.

BACKGROUND OF THE INVENTION

Many implements are known for the performance of domestic yard work, examples being given in the patent literature: U.S. Pat. No. 342,516 issued May 25, 1886; U.S. Pat. No. 375,556 issued Dec. 27, 1887; U.S. Pat. No. 488,918 issued Dec. 27, 1892; U.S. Pat. No. 809,476 issued Jan. 9, 1906; U.S. Pat. No. 840,903 issued Jan. 8, 1907; U.S. Pat. No. 933,227 issued Sep. 7, 1909; U.S. Pat. No. 1,039,012 issued Sep. 17, 1912; U.S. Pat. No. 1,065,456 issued Jun. 24, 1913; U.S. Pat. No. 1,647,832 issued Nov. 1, 1927; Swiss Patent No. 137,681 issued Apr. 1, 1930; U.S. Pat. No. 1,692,436 issued Nov. 20, 1928; U.S. Pat. No. 2,018,279 issued Oct. 22, 1935; U.S. Pat. No. 2,030,770 issued Feb. 11, 1936; Swiss Patent No. 179,360 issued Nov. 16, 1935; U.S. Pat. No. 2,531,297 issued Nov. 21, 1950; U.S. Pat. No. 2,686,690 issued Aug. 17, 1954; British Patent No. 865,902 issued Apr. 19, 1961; U.S. Pat. No. 3,123,391 issued Mar. 3, 1964; U.S. Pat. No. 3,273,930 issued Sep. 20, 1966; U.S. Pat. No. 3,333,881 issued Aug. 1, 1967; U.S. Pat. No. 3,443,830 issued May 13, 1969; U.S. Pat. No. 3,602,542 issued Aug. 31, 1971; U.S. Pat. No. 3,847,227 issued Nov. 12, 1974; U.S. Pat. No. 4,603,744 issued Aug. 5, 1986; U.S. Pat. No. 4,819,735 issued Apr. 11, 1989; U.S. Pat. No. 4,932,339 issued Jun. 12, 1990; U.S. Pat. No. 5,005,888 issued Apr. 9, 1991; Canadian Patent No. 1,290,969 issued Oct. 22, 1991; U.S. Pat. No. 5,242,024 issued Sep. 7, 1993; U.S. Pat. No. 5,338,078 issued Aug. 16, 1994 and U.S. Pat. No. 6,076,614 issued Jun. 20, 2000.

Particularly related to this invention are tools having lower members designed to engage and penetrate the ground through pressing downwardly, and usually an additional rotational force, e.g., prongs or tines at the lower end of shaft, the lower ends of which prongs engage the ground and upon rotation of the shaft dig into the ground to cultivate, aerate, or otherwise till the soil etc. Such tools are described in U.S. Pat. No. 256,039 issued Apr. 4, 1882, U.S. Pat. No. 2,082,476 issued Jan. 17, 1936, U.S. Pat. No. 4,905,768 issued Mar. 6, 1990, U.S. Pat. No. 5,207,466 issued May 4, 1993, U.S. Pat. No. 5,706,900 issued Jan. 13, 1998, U.S. Design Patent No. 406,219 issued Mar. 2, 1999, U.S. Pat. No. 6,467,551 issued Oct. 22, 2002, U.S. Pat. No. 6,536,535 issued Mar. 25, 2003, U.S. Patent Application Publication No. 2003/0230450 published Dec. 18, 2003.

SUMMARY OF THE INVENTION

The present invention provides a manual garden tool. The tool includes a shaft having an upper end and a lower end, with a ground-engaging implement at the lower end. Typically, the ground-engaging implement is a set of tines or other sort of device that is suitable for tilling or breaking up soil in a garden as by pressing and/or rotating the tool by a handle at the upper end of the shaft. In this invention, the tool includes an actuator rotatably mounted at the lower end of the shaft. The actuator is rotatable between first and second positions that are angularly spaced from each other. As the actuator is moved between its first and second positions, the ground engaging implement moves between extended and contracted positions. This is achieved by an upper portion of the implement being rotatably mounted to the actuator and the tool including an abutment located at the lower end of the shaft in contact with a surface of the implement so that, as the actuator is moved (as by rotation with respect to the central axis of the shaft) between its first and second positions, the upper portion of the implement also rotates with respect to the actuator and the lower portion of the implement is forced to move between its contracted and extended positions by virtue of its contact with the abutment.

Preferably, the ground-engaging implement is a set of tines, at least two, more typically three or four, but there could be more tines. Each such tine has an upper upwardly extending arm having a central axis, and the actuator has an aperture into which the arm is received so that the arm of the tine can rotate with respect to the actuator about an axis that is parallel to the central axis of the shaft. Thus, when the actuator is rotated on its central axis (which is coincident with the central axis of the shaft), and the contact of the tine with the abutment forces the tine to move with respect the actuator, the upper arm of the tine rotates about its own axis. As a result of this rotation of the arm about its axis, the lower portion of the tine moves toward or away from the central axis of the shaft, as the case may be, between expanded and contracted positions.

In the case of a tine, the lower portion of the tine is spaced radially outwardly of the upper portion of the tine and the upper and lower portions are rigidly affixed to each other by an arm that extends between (connects) the upper and lower portions of the tine.

In one embodiment, the first position of the lower portion of the tine is located radially inwardly of the second position of the lower portion of the tine, and the abutment is rigidly affixed to the shaft and the surface of the abutment abuts the laterally extending arm as the actuator is moved i.e., rotated from its first to its second position so as to force the lower portion of the tine to move radially outwardly.

In another aspect, the first position of the lower portion of the tine is located radially inwardly of the second position of the lower portion of the tine, and the abutment is rigidly affixed to the shaft and the abutment surface abuts the lateral arm of the tine as the actuator is moved from its second to its first position so as to force the lower portion of the tine to move radially inwardly.

Accordingly, it is possible to include two such abutments, one which works in conjunction with each direction of rotation of the actuator: one abutment cammingly forcing the tine radially outwardly and the other abutment cammingly forcing the tine radially inwardly. Here, the first position of the lower portion of the tine is located radially inwardly of the second position of the lower portion of the tine, and there is a first such abutment, rigidly affixed to the shaft and having a surface which abuts the laterally extending arm as the actuator is moved from its first to its second position so as to force the lower portion of the tine to move radially outwardly, and there is a second such abutment, rigidly affixed to the shaft and having a surface which abuts the laterally extending arm as the actuator is moved from its second to its first position thereof so as to force the lower portion of the tine to move radially inwardly.

In another aspect, the actuator is movable between an upper position and a lower position, and the tool includes a first seat for receipt therein of the laterally extending arm of the tine, when the lower portion of the tine is in the first position, as the actuator is moved into the lower position, to affix the tine against movement from the first position (i.e., to affix the upper arm of the tine against rotation about its axis), and a second seat for receipt therein of the laterally extending arm of the tine, when the lower portion of the tine is in the second position (again to affix the upper arm of the tine against rotation about its axis), as the actuator is moved into the lower position, to affix the tine against movement from the second position.

In such an embodiment, the tine is affixed against axial movement with respect to the actuator (i.e., the tine is mounted to the actuator to move axially up and down the shaft with the actuator) such that, when the actuator is in the upper position, clearance is provided for the laterally extending arm from the first and second seats to permit movement of the laterally extending arm as the actuator is rotated between the first and the second positions thereof. Typically, the tool includes a lock for securing the actuator into its lower position, thereby securing the tines into their seated positions.

Further, it is preferred that the actuator be biased toward its upper position and that the lock include a lever rotatably mounted to the shaft about an axis of rotation transverse to the axis of the shaft, between an open first position and a locking second position. Such a lever includes a cam surface which engages a surface of the actuator to move the actuator into the lower position upon rotation of the lever from its open to its locking position thereof. Because the actuator is biased upwardly release of the lever from its locking position to its open position results in spontaneous movement of the actuator (and thus the tines also) into the upper position. The biasing of the actuator can be provided by something a simple as a compression spring. In the preferred embodiment, the actuator has a cylindrical housing (square in cross section) and upper and lower plates secured thereto as by welding. The spring bears against the underside of the upper plate, and against the upper surface of a stop plate that is welded at the lower end of the tubular shaft. The stop plate is a single piece of metal bent into a configuration that provides upwardly directed walls that define the seats for the tines. In the preferred embodiment the seat which secures a tine against rotation out of its expanded position shares a wall with the seat which secures the tine against rotation out of its contracted position. This common, or intermediate wall is of reduced height with respect to the remaining walls of the seat such that when the tine is moved upwardly along the shaft into its upper position, clearance is provided for the tine (particularly the lateral arm of the tine) to move past the intermediate wall, i.e., so that the tine can move between its expanded and contracted positions.

Each tine can be a single piece of metal, e.g., bent to form an upper arm, lateral arm and downwardly extending arm having a lower end shaped or otherwise formed appropriately so as to be suitable for engaging garden soil.

According to one aspect, the actuator includes a downwardly facing lower surface and the tool includes a stop plate having a lower bed having an upwardly facing surface, and the lateral arm of the tine is sandwiched between the lower and upwardly facing surfaces when the actuator is in the lower position. The first seat can include first and second surfaces of upwardly extending walls of the stop plate, and the second seat can include third and fourth surfaces of upwardly extending walls of the stop plate. As mentioned above, the second and third surfaces can be provided on opposing surfaces of a single wall that serves to be part of both seats The stop plate can be a single piece of bent metal.

Preferably, the tool includes four tines and movement of the tines from the contracted to the expanded positions is achieved by rotation of the actuator, when in its upper position, by a turn of 90° (¼ of a full rotation) about the shaft axis in one angular direction (e.g. clockwise), and conversely, movement of the tines from the expanded to the contracted positions is achieved by turning the actuator 90° in the opposite angular direction (e.g. counterclockwise). Preferably, the actuator and stop plate have upright surfaces which abut each other when the actuator is in the lower (locking) position so as to affix the actuator and stop plate (itself rigidly affixed to the shaft) against rotation with respect to each other when the actuator is in its lower position.

In another aspect, the invention provides a manual garden tool having an improved handle arrangement. The tool includes a shaft with a ground-engaging implement at the lower end of the shaft for working soil by downward insertion of the implement into and/or rotation of the implement in the soil. The handle is generally of a molded material, preferably plastic, secured at the upper end of the shaft and having first and second hand grips spaced radially from the shaft. There is a rigid support secured at the upper end of the shaft and extending radially outwardly of the shaft. The support is connected between the shaft and handle such that downward forces generated at the grips by said downward insertion are distributed across the support, i.e., the support, by extending radially outwardly of the shaft assures that applied forces are transferred from the handle to the shaft at other than an area localized in an area immediately around the shaft.

Preferably, the support is affixed permanently to the shaft and includes an upper surface extending radially outwardly of the shaft in abutment with a lower surface of the handle such that the downward forces applied to the grips of the handle are distributed across the upper surface of the support.

Also, it is preferred that the support is connected between the shaft and handle such that angular forces generated at the grips (as by rotational forces applied by the user to the grips) of the tool with respect to an axis of the shaft by rotation of the tool about the axis are distributed across the support. In this case, as an example, the support includes an upright surface (or vertical edge) extending laterally of the shaft and extending radially outwardly of the shaft, and the handle includes a surface extending laterally of the shaft and extending radially outwardly thereof in abutment with the surface of the support to distribute said angular forces from the handle to the support through the abutting surfaces at a location radially outward of the shaft. The support and the handle thus have surfaces parallel to plane passing through a central axis of the shaft, and which abut each other, so that when the handle is turned to rotate the tool the abutting surfaces (which extend radially outward of the shaft) cause the applied forces to be distributed outwardly of the shaft, again to assure that applied forces are transferred from the handle to the shaft at other than an area localized in an area immediately around the shaft.

Preferably the handle is made up of a single piece of injection molded plastic.

The grips of the handle can be located diametrically opposite each other with respect to a central axis of the shaft, and the support can extend toward each grip up to about 90% the distance of the grip from the center of the shaft.

The handle can include first and second angularly spaced apart spokes that project radially outwardly of the shaft and connect first and second ends of each grip to provide clearance for a user's fingers between the grip, spokes and shaft.

Each grip preferably has first and second ends angularly spaced from each other with respect to the central axis of the shaft, the support is a metal piece extending radially outwardly of the central axis of the shaft, and the support has a central axis angularly located between the first and second ends of each grip.

The grips are preferably spaced apart from each other by a distance of between 8 and 20 inches (more preferably between 10 and 16, or 11 and 16, or 12 and 16, or 10 and 18, or 11 and 18, or 12 and 18 or 13 and 16 inches), each grip is between about three inches and seven inches in length (more preferably between about four and 6 includes), the support extends laterally of the central axis thereof a distance of between one eighth inch and about three inches (more preferably between about one quarter and three inches, or one half and three inches, or one half and two inches, or one and two inches), and the support has a length of between about one and one half inches and about ten inches (more preferably between about one and one half inches and eight inches, or between about one and one half inches and six inches, or between about two inches and six inches, or between about two inches and five inches, or between about three inches and four inches).

The shaft can be a hollow metal tube of constant cross section (preferably of circular cross section) and the support and shaft can be welded to each other.

The shaft is typically of a length such that the overall height of the tool is between about three and four feet. The shaft can be adjustable in length so that the height of the tool is adjustable for users of different height, or according to preference.

BRIEF DESCRIPTION OF THE DRAWINGS

A detailed description of embodiments of the invention is provided below, reference being had to the accompanying drawings in which:

FIG. 17 is a bottom plan view of the handle.

DETAILED DESCRIPTION OF THE INVENTION

Figure 1:
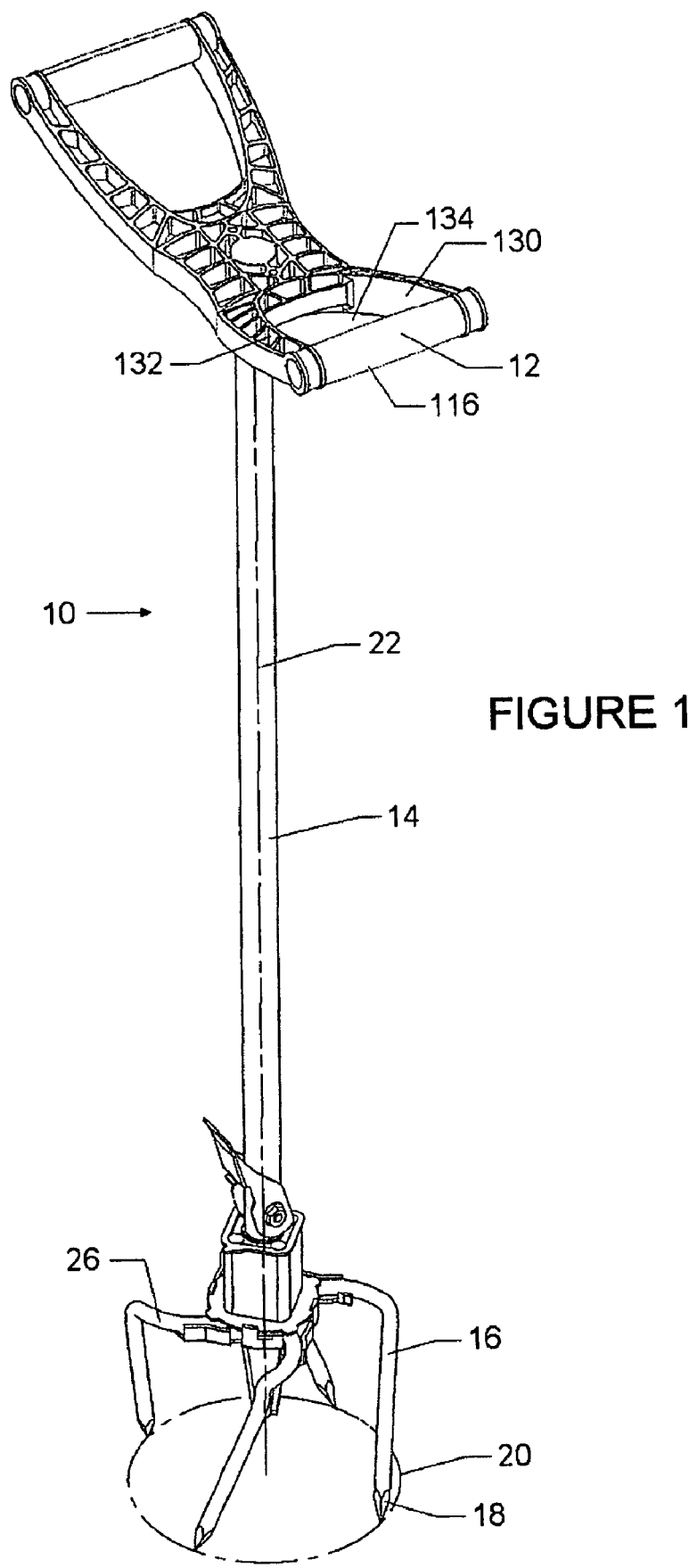
FIG. 1 is a perspective type view of the invention having a unitary shaft, tines of the tool being in an expanded position.

Turning to the drawings, a particular embodiment of a tool of the invention is generally illustrated in FIG. 1. Tool 10 includes handle 12, shaft 14 and ground-engaging tines 16.

Figure 2:
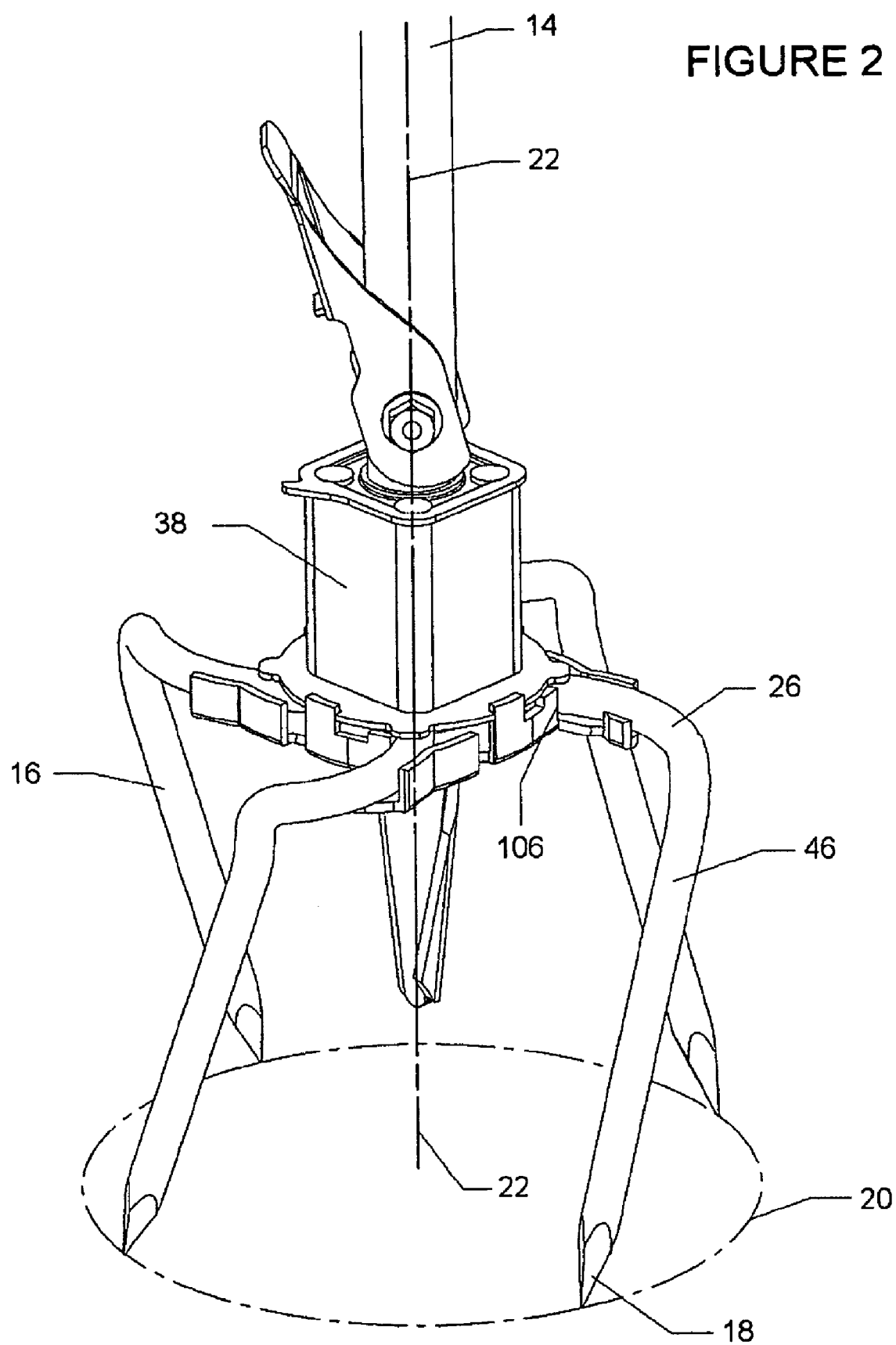
FIG. 2 is a perspective type view of the lower end of the tool, tines of the tool being in their radially expanded position and the actuator being in the locked position.
Figure 3:
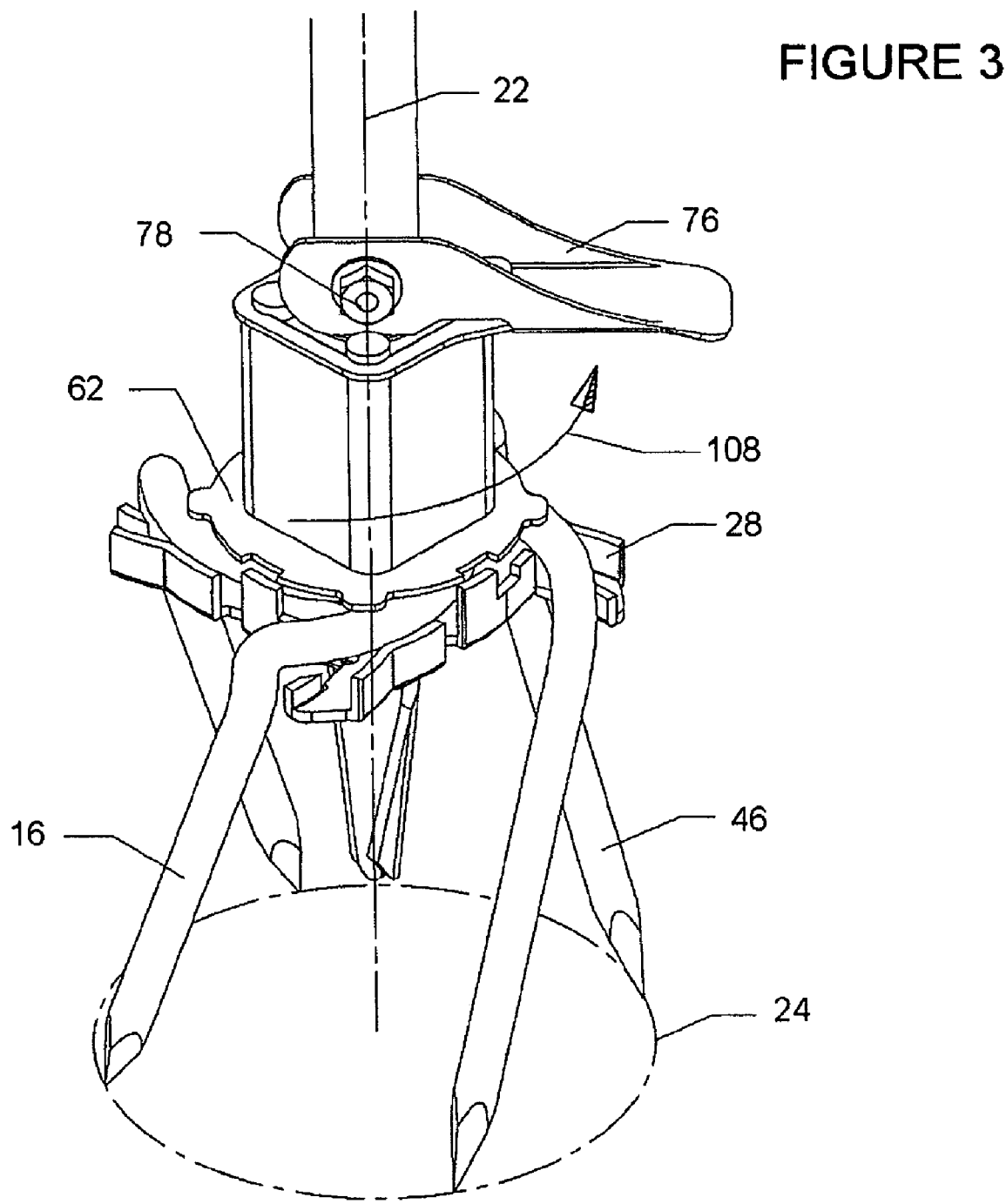
FIG. 3 is a view similar to that of FIG. 2 with the tines of the tool in their radially contracted position and the actuator in the unlocked position.

Tines 16 can be affixed in the expanded position illustrated in FIGS. 1 and 2, or in the contracted position shown in FIG. 3. The mechanism for movement of the tines between the two positions is described further below. For now, one can see in FIG. 2 that tine tips 18 trace a circular path of revolution 20 about central shaft axis 22, circle 20 having a diameter of about 6 inches (about 15 cm). Thus, with the tines in the expanded position, as the tool is rotated about shaft axis 22, the tine tips trace out a circle having a diameter of about 6". In FIG. 3, on the other hand, with the tines in the contracted position, the diameter of the path of revolution 24 is about 4 inches (about 10 cm). The tines are manually adjustable by a user between the contracted and expanded positions, the mechanical elements of the adjustable mechanism being explained in greater detail below. It will be appreciated that the radial spacing of the tines in the two positions is a matter of design choice, smaller or larger contracted positioning being possible, and smaller or larger expanded positioning being possible.

During use of the tool for tilling or cultivation of soil, the adjustable tines are secured in the expanded or contracted operational position, as desired. In the expanded operational position, each tine 16 has radial arm 26 that extends outwardly of the axis shaft and is seated in channel 28 defined between upright surfaces of walls 30, 32 and bed 34 of stop plate 56. Surfaces of upright walls 30, 32 and bed 34 against which radial arm 26 abuts to secure the tine in the expanded operational position thus together define a seat for arm 26. The tool includes actuator 38 mounted on the shaft, to rotate about shaft axis 22. In the secured expanded position, each tine 16 is affixed against axial movement with respect to the shaft, arm 26 being sandwiched between lower outer surface 36 of lower housing plate 62 and bed surface 34. The mechanism by which actuator 38 is axially locked into position is described below. Similarly, in the contracted position of FIG. 3, arm 26 is seated in channel 40 defined between upright surfaces of walls 32, 44 and bed 34 of the stop plate. Surfaces of walls 32, 44 and bed 34 against which radial arm 26 abuts to secure the tine in the contracted operational position thus together define a seat for arm 26. Again, each tine 16 is affixed against axial movement, parallel to the axis of the shaft, by being sandwiched between actuator housing lower surface 36 and bed surface 34. The mechanism of movement of the tines between the expanded and contracted positions is described below.

Figure 4:
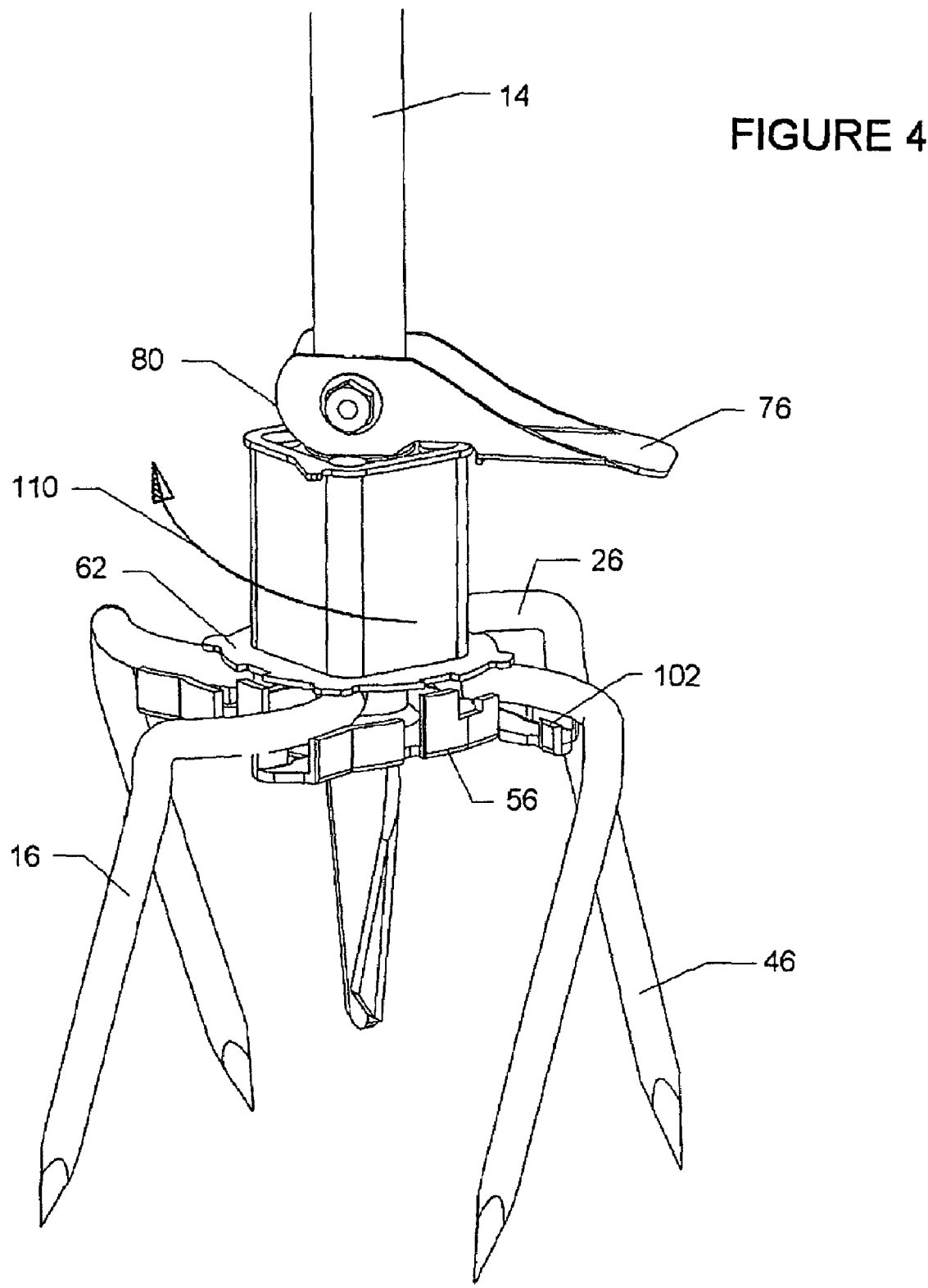
FIG. 4 is a view similar to that of FIG. 3 with the tines of the tool in their radially extended position and the actuator in the unlocked position.
Figure 5:
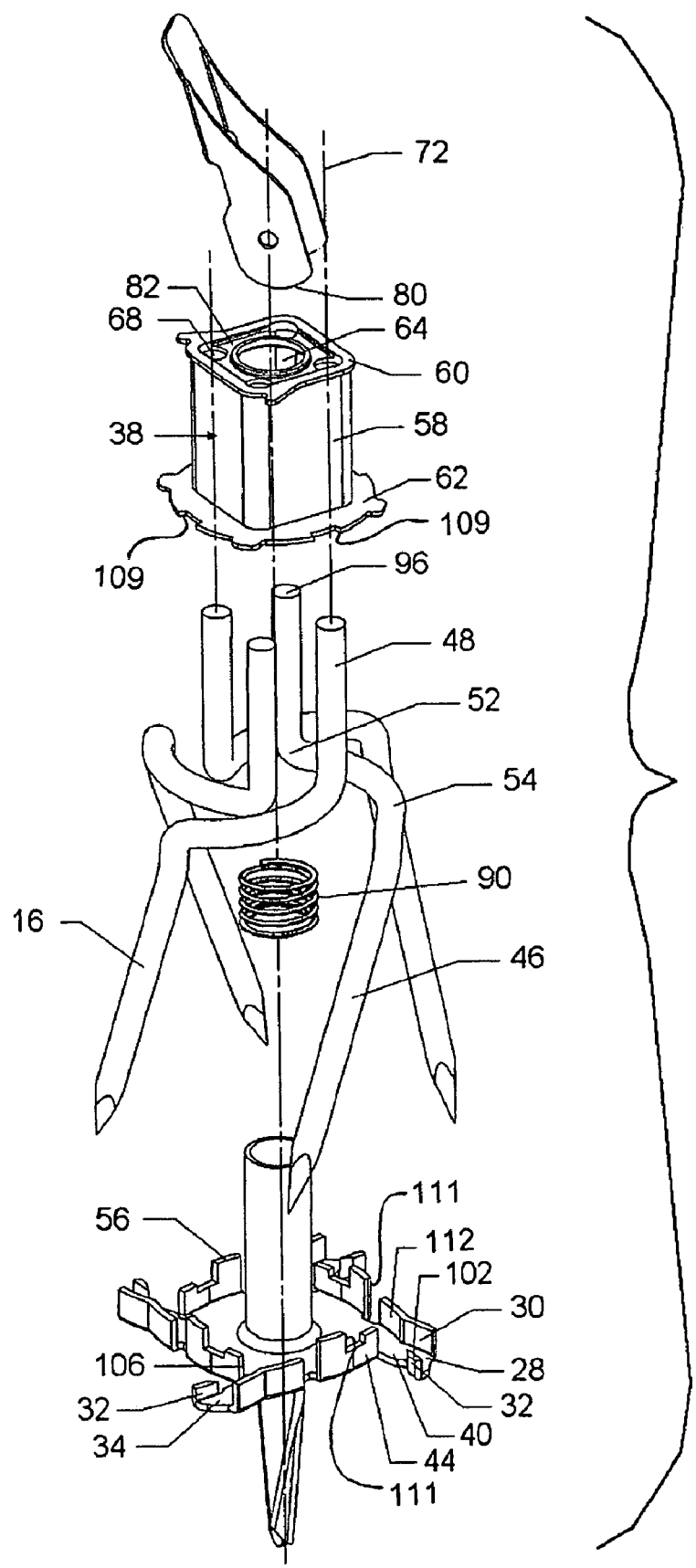
FIG. 5 is an exploded representation of the actuator and tine adjustment mechanism.
Figure 5A:
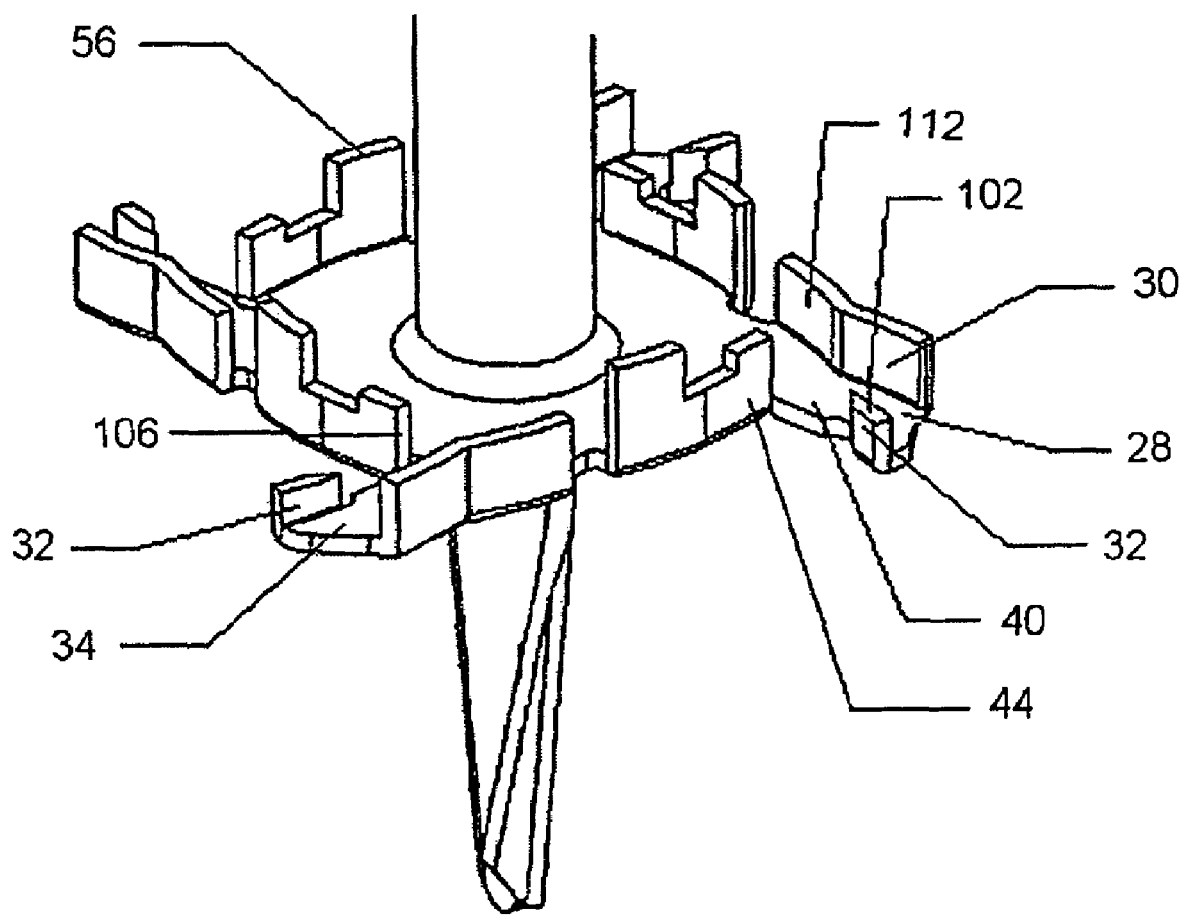
FIG. 5a is an enlarged view of the stop plate of the tool.
Figure 6:
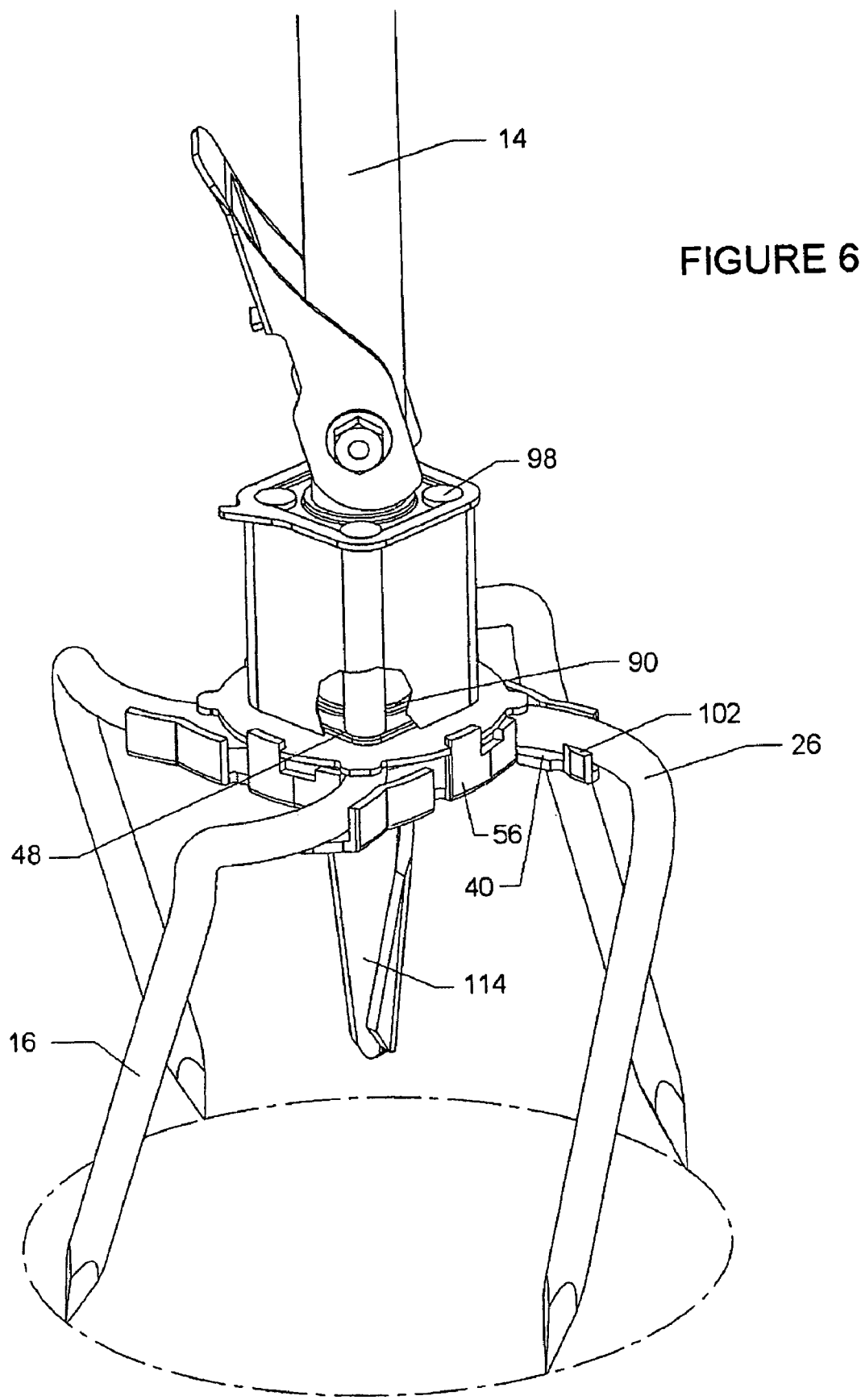
FIG. 6 is a view similar to FIG. 2 with the actuator housing partially cutaway.

Turning to FIGS. 3 to 5, a description of the mechanism by which tines move between their expanded and contracted positions will now be provided. The movement of one tine is described, the mechanism being the same for all four tines. It will be appreciated that the principle of the invention can be applied to a tool having more or fewer than four tines.

Tine 16 includes downwardly depending leg 46, lateral arm 26 which extends generally radially outwardly of the central axis of the shaft, and upwardly directed arm 48. The tine is of unitary construction, being e.g., of bent metal of low carbon steel. Upwardly directed arm 48 is relatively straight, of circular outer cross-section, i.e., cylindrical, and in the assembled tool has a central axis 50 that is generally parallel to central shaft axis 22. Arm 48 is connected to lateral arm 26 at inner elbow 52, which in turn is connected to lower leg 46 at outer elbow 54. Tine tip 18 is suitably shaped for its intended purpose, e.g. to work or till ground in cooperation with its counterpart tines.

Movement of the tines between their expanded and contracted positions is obtained by manual rotation of actuator 38 about central axis 22 of shaft 14. Actuator 38 is made up of housing cylinder 58, upper plate 60 and lower plate 62, the plates and cylinder being of metal welded together or otherwise suitably affixed together as a unit. Upper plate 60 defines central circular aperture 64, concentrically located on the central axis of the cylinder. Aperture 64 is sized to receive shaft 14 therethrough, the shaft having a constant circular outer cross section, so that in the assembled tool the actuator can be rotated with respect to the shaft, the axis of rotation for the cylinder being coincident with central axis 22 of shaft 14.

Upper plate 60 further defines circular aperture 68 radially spaced from central aperture 64. Aperture 68 is dimensioned for receipt therethrough of tine upper arm 48. There are four such apertures in plate 60, one for each tine, the apertures being equally angularly spaced apart from each other, and lying concentrically spaced from the center point of the central aperture of the plate. Arm 48 is of relatively constant circular cross section and dimensioned for receipt through communicating aperture 68 such that in the assembled tool the tine can rotate with respect to the housing about an axis of rotation that is coincident with axis 72 running through the center points of apertures 68. One can thus see that rotation of the actuator causes the movement of the upper tine arms on circle 74, centered on shaft axis 22.

Figure 7:
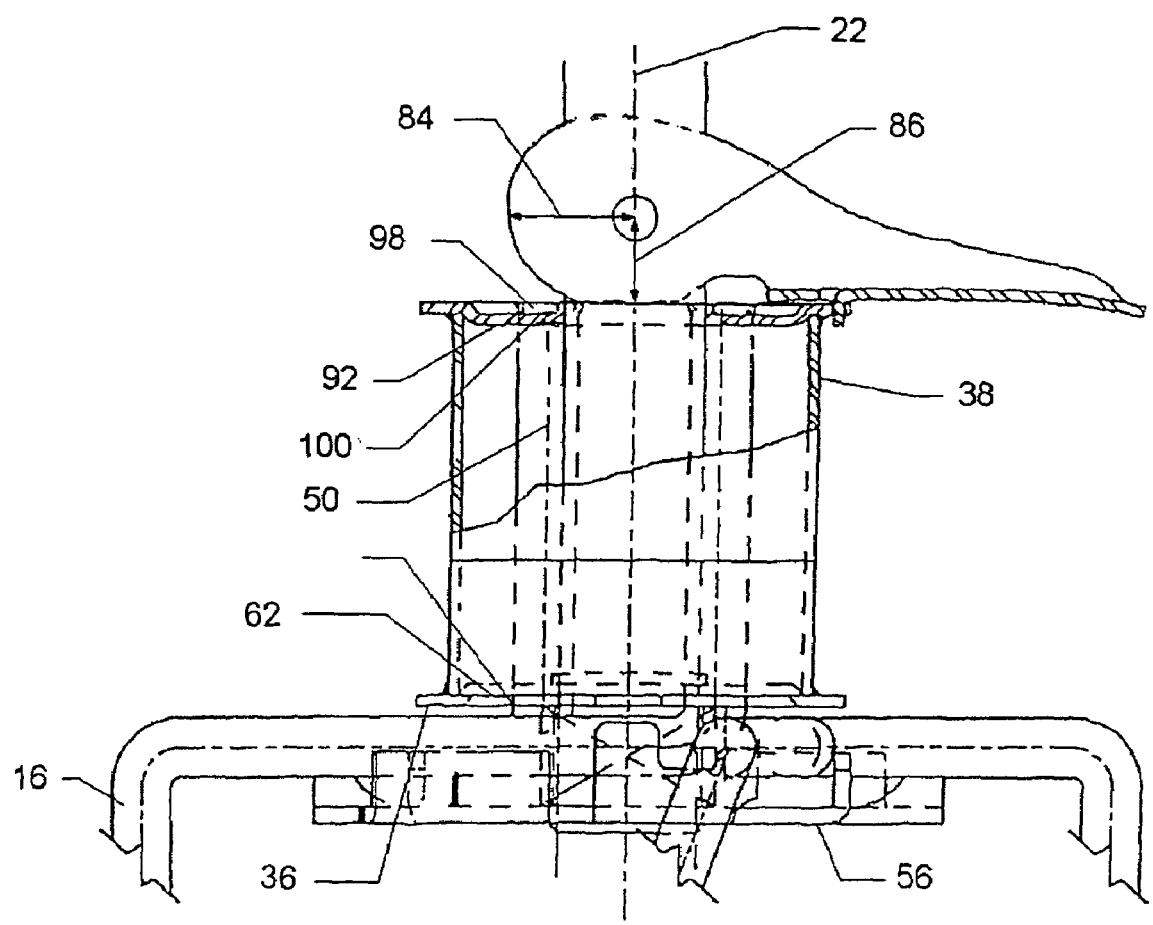
FIG. 7 is a sectional side elevation of the working end of the tool, the actuator housing being partially cutaway, with the actuator in the unlocked position and the tines in the extended position.
Figure 8:
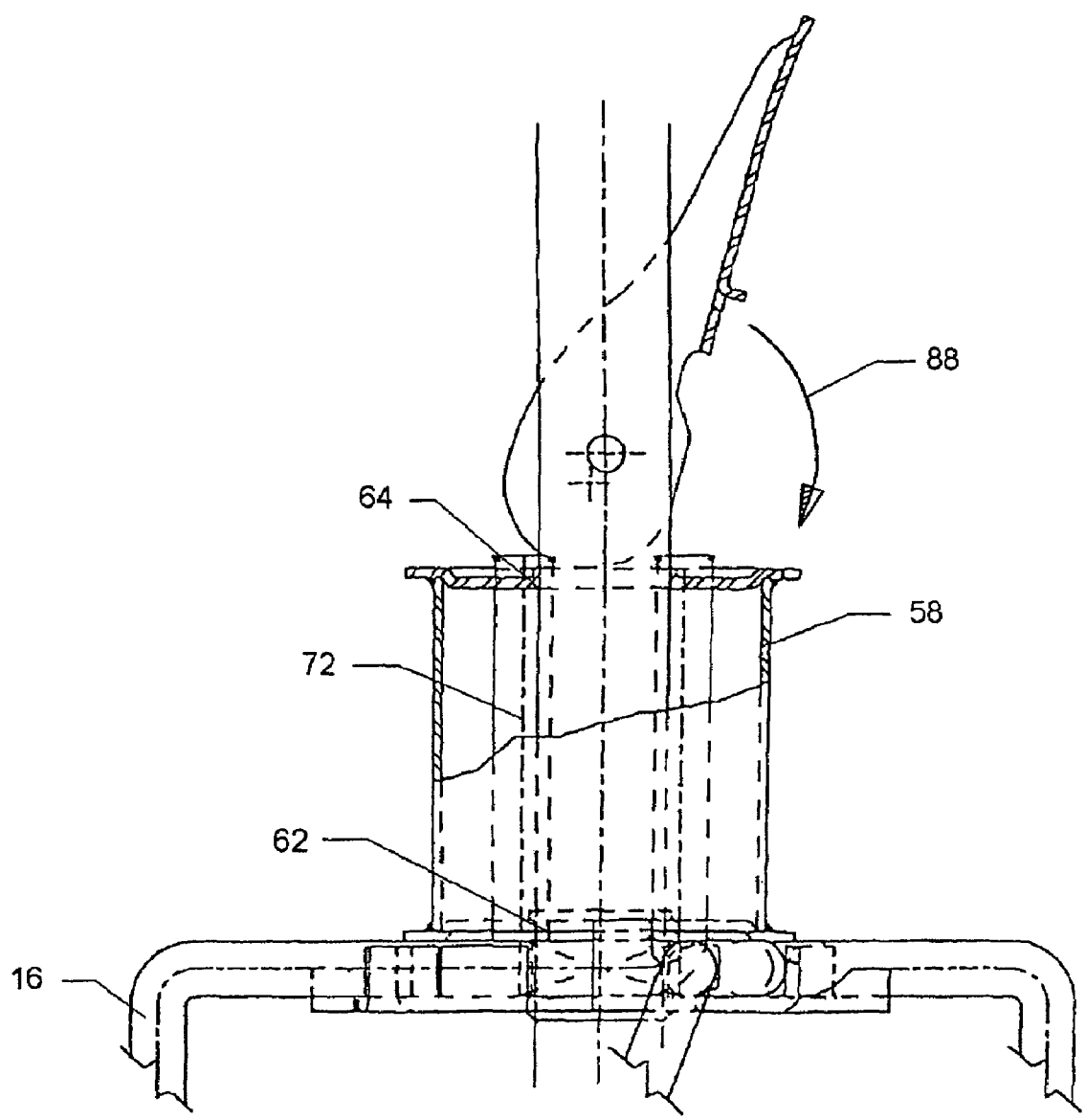
FIG. 8 is a sectional side elevation of the working end of the tool, the actuator housing being partially cutaway, with the actuator in the locked position and the tines in the extended position.
Figure 9:
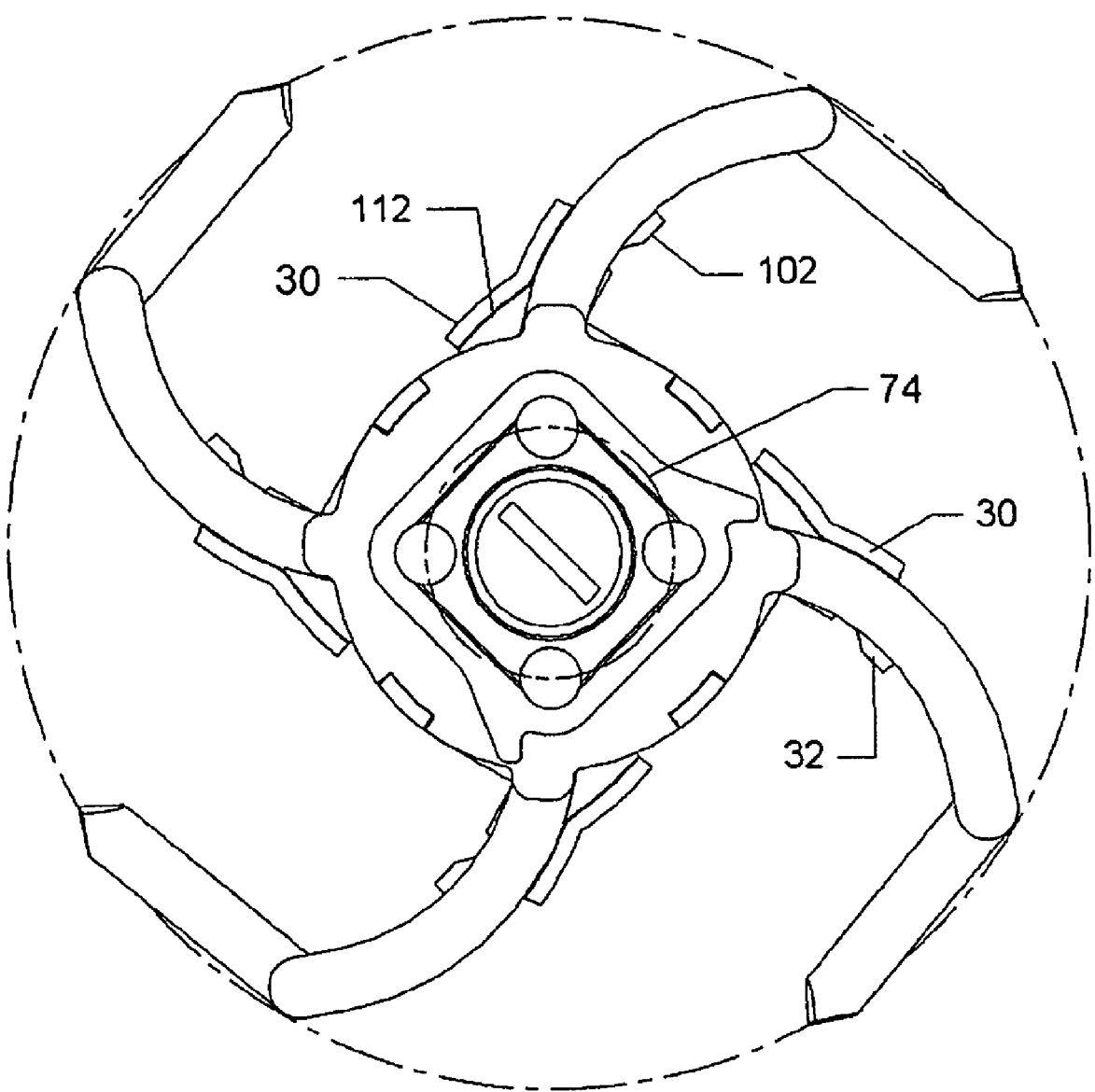
FIG. 9 is a top plan view of the lower end of the tool showing the tines in the extended position.
Figure 10:
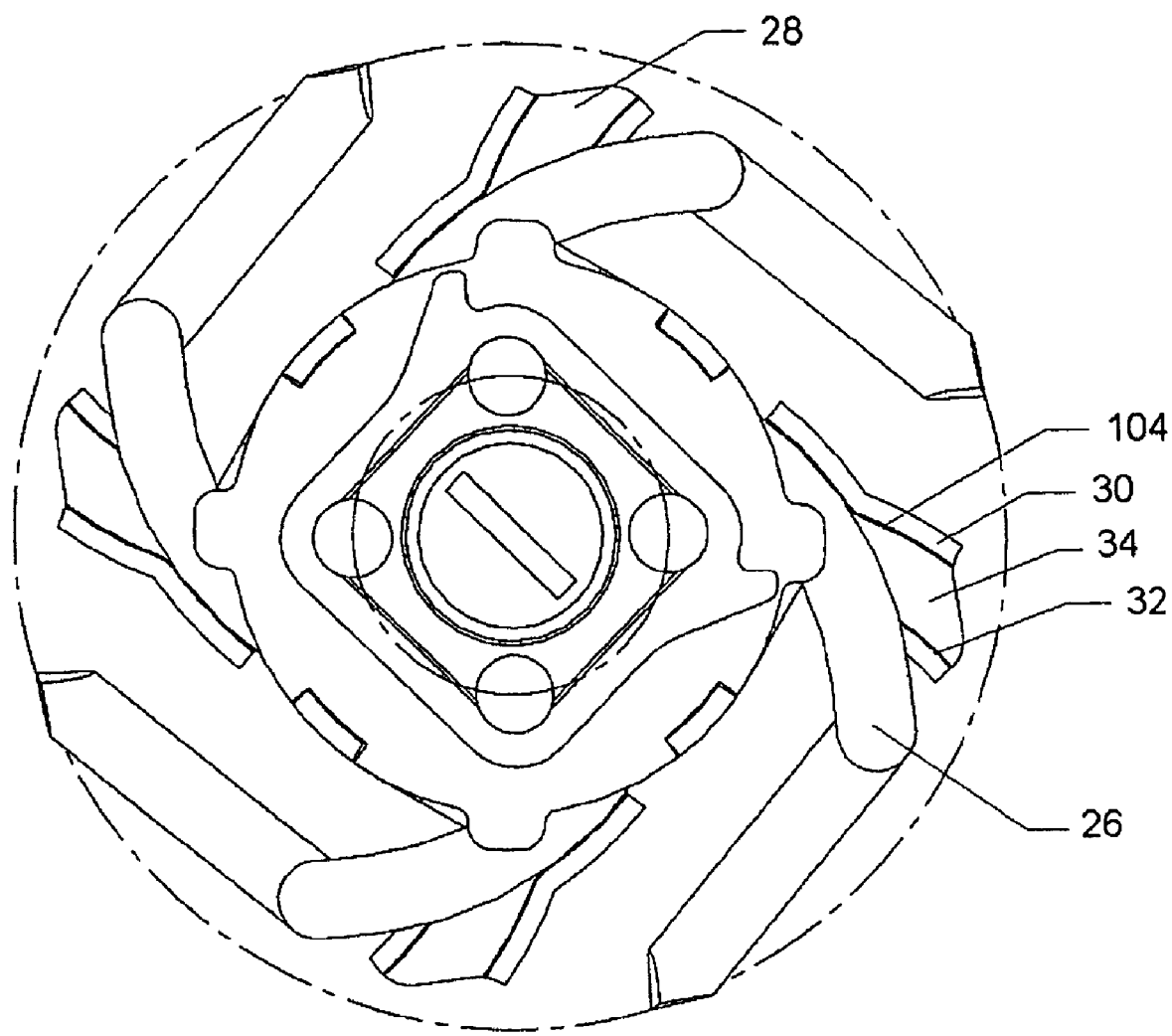
FIG. 10 is a top plan view of the lower end of the tool showing the tines in the contracted position.

In addition to rotational motion, actuator 38 can be moved axially along the shaft, i.e., in a direction parallel to shaft axis 22. As previously mentioned, in operational position, tines are received within channels of stop plate 56 and axially sandwiched between lower outer surface 36 of housing plate 62 and bed surface 34 of plate 56. In this position, actuator 38 is in its axially lowermost position. Actuator 38 is secured downwardly in this position by locking lever 76 pivotally mounted to the shaft by bolt 78. The locking position of the lever can be seen in FIGS. 1 and 2. Lever 76 includes eccentric surface 80 which bears against outer upper surface 82 of plate 60 in the locking position to hold the actuator and tines in the axially lower (locked) position. Lever 76 is rotatable about the central axis of bolt 78 and so surface 80 is eccentric in the sense that it is not concentric with respect to the axis of rotation of the lever. Distance 84 is greater than distance 86, illustrated in FIG. 7, so that when the lever is rotated in the direction of arrow 88 from the locking position to the unlocked position of FIG. 3 (and FIGS. 4 and 7), the lowermost point of surface 80 is axially higher than when in the lever is in the locked position shown in FIGS. 1, 2, 5, 6 and 8. This in turn creates clearance for the actuator to travel upwardly along the shaft. Actuator 38 is biased upwardly by compression spring 90 which bears against the inner surface 92 of the upper actuator housing plate 60 and the upper surface of stop plate 56. In this way, when the locking lever is moved towards its unlocked position spring 90 forces the actuator to move upwardly.

As mentioned above, upper arms 48 of the tines are received through apertures 68 of the upper plate of the actuator housing. Upper tip 96 of each tine has a disc 98 welded thereto, which extends radially outwardly of the curved sidewall of the tine, the underside 100 of which disc abuts the surrounding outer surface 82 of plate 60. Consequently, when the actuator moves upwardly along the shaft, the tines are forced to move with the actuator upwardly along the shaft.

As the tines move upwardly in conjunction with the actuator, the lateral arms 26 move upwardly and out of the channels into which they are securely seated for use of the tool. As this happens, the lateral arms of the tines are moved into a position above the top 102 of wall 32, so that upon lateral movement of the tine (as by rotation about axis 72) clearance is provided for movement of the lateral arm past wall 32.

Wall 30 and wall 44 extend upwardly past the height of intermediately located wall 32, and their respective inner surfaces 104, 106 thus provide cam surfaces for lateral arms 26 of the tines. With reference to FIG. 3, with the actuator in the raised and unlocked position, rotation of the actuator about the shaft in the direction of arrow 108 forces the inner edge of lateral arm 26 against surface 106 of wall 44 which in turn causes the tine to rotate about the central axis of the upper arm of each tine (counterclockwise as viewed from the top of FIG. 3) causing the tine to swing outwardly to move from its contracted position (as illustrated in FIG. 3) to reach its extended position shown in FIG. 4. The counterclockwise movement is limited by abutment of the lateral arm of the tine with surface 104 of wall 30.

With reference to FIG. 4, movement of the tines from the radially expanded position to the contracted position is achieved by rotation of the actuator with respect to the shaft in the direction of arrow 110. In this case, the outer surface of the lateral arm of each tine is drawn against inner surface 112 of wall 30 to force the upper arm of the tine to rotate about its axis (clockwise as viewed from the top) such that the tine swings inwardly into its contracted position.

Once in the extended or contracted position, as desired by the user, locking lever is moved into the locked position, forcing the actuator and tines downwardly along the shaft, bringing the lateral arms of the tines into channel 28 or channel 40 as the case may be. Friction fit of the locking lever in the locking position secures the actuator and tines in the locked position for use. The actuator is itself further locked against rotation with respect to the shaft by abutment of lateral surface 109 of the lower actuator plate and lateral surface 111 of the stop plate. The actuator and stop plate are thus affixed against rotation against each other, when the actuator is in the lower position, by the interlocking of the two members brought about by abutment of upright surfaces 109, 111, the surfaces extending radially of the shaft axis.

The illustrated embodiment has four tines and the movement of the tines between their contracted and expanded positions is achieved by rotation of the actuator by one quarter rotation about the shaft axis, i.e., an angular rotation of 90°. The change in radial position of the tine tips is between radii of 2" to 3". The expanding camming action of the tool can thus be expressed as a ratio of radial movement of 3/2 per 90° turn of the actuator. By this measure, the degree of camming action could be altered while remaining within the scope of this invention, e.g. lowered to 3/2 per 120° turn of the actuator, or it could be raised, e.g. to 4/2 to 90° turn of the actuator. Intermediate degrees of camming action can also be achieved.

The working end of the tool includes optional central auger 114 welded at the lower end of shaft 14. As can be seen, tilling of garden soil or the like can be achieved by grasping hand grips 116, contacting the tine tips with the ground and rotating the tool in a clockwise direction (as viewed from above), and pressing down. Entry of the tines into the soil will bring the auger into contact with the ground for further tilling effect.

Handle 12, illustrated more fully in FIGS. 13 to 17, is formed of injection molded material, e.g. plastic such as high density polyethylene or polypropylene, etc. Handle 12 is injection molded in a single step to obtain a piece of unitary construction.

Welded at the upper end of shaft 14 is metal support 118 that is between about $^{80}/_{1000}$" and $^{100}/_{1000}$" thick, and being between about 3½" and 4" in length. Support 118 is generally rectangular having edges 121, 123, 125, 127, the shorter edges of the rectangle being slightly curved inwardly, and dimensioned to fit into downwardly open aperture formed between walls 120, 122, 124, 126 of handle 12. Upper surface 119 of support 118 abuts against lower surfaces 128 within the aperture of the handle.

Handle 12 is fastened to the shaft by any suitable means. In the FIG. 13 embodiment, support 118 is provided with two holes 136 for receipt of screws 138 therethrough. Screws 138 are received into handle apertures 140. The screws are threaded and the holes dimensioned with respect to the screws such that the threads become embedded in the plastic as they are screwed into the holes, for securing the handle to the shaft. In the FIG. 14 embodiment, the shafts of threaded bolts 142 are received through holes 136, 140 and nuts 144 threaded thereonto to secure the handle to the shaft of the tool.

It can thus be appreciated that to press tines 16 into the ground for working the soil, the tool is grasped by grips 116 and pressure applied downward. Further, penetration of the tines into the ground can be obtained by rotation of the tool about the shaft axis, in the clockwise direction when viewed from above. The downward forces generated at the grips are distributed across the support by abutment of underside surfaces 128 of the handle with upper support surface 119 so as to reduce localized pressure or strain on the plastic handle in the vicinity of the shaft to increase the robustness of the tool. Further, during rotation of the tool by application of angular forces on the handle grips, abutment of the support edges 121, 123, 125, 127 against respective side walls 120, 122, 124, 126 of the handle cause the applied forces to be distributed across the support, generally in a plane parallel to the major plane of support 118 to reduce localized pressure on the plastic handle than would otherwise be the case. Such distribution of forces reduces localized stresses on the plastic handle, increasing the resiliency of the overall handle arrangement thus reducing the propensity for breakage of the plastic handle.

Handle grips 116 are located diametrically opposite each other with respect to central shaft axis 22. In the illustrated embodiment, handle 12 is about 14½" inches diametrically across and each grip is about 5½" inches from end to end. Support 118 extends toward each grip a radial distance of about 14% of the radial distance of the center of each grip from the center axis of the shaft. Robustness of the handle portion of the tool could be increased by increasing the length of the support, say up to about 40%, 50%, 60%, 70%, 80% or even 90% the distance of the grip from the center of the shaft.

Handle 12 includes angularly spaced apart spokes 130, 132 which connect first and second ends of each grip to the central handle portion to provide a robust handle, while internal space 134 between the spokes provides clearance for a user's fingers between the grip, spokes and shaft for assured handling of the tool.

Figure 11:
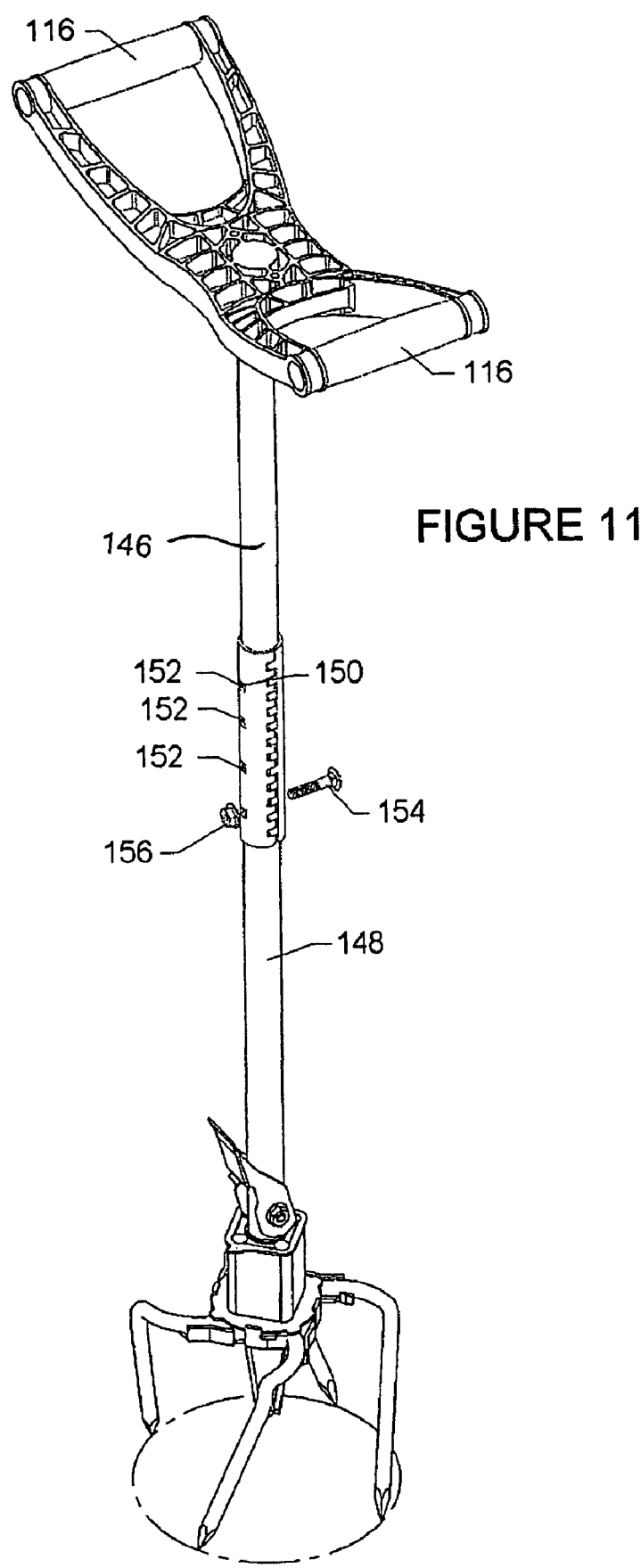
FIG. 11 shows a first alternative embodiment of the invention having a shaft adjustable in height.
Figure 12:
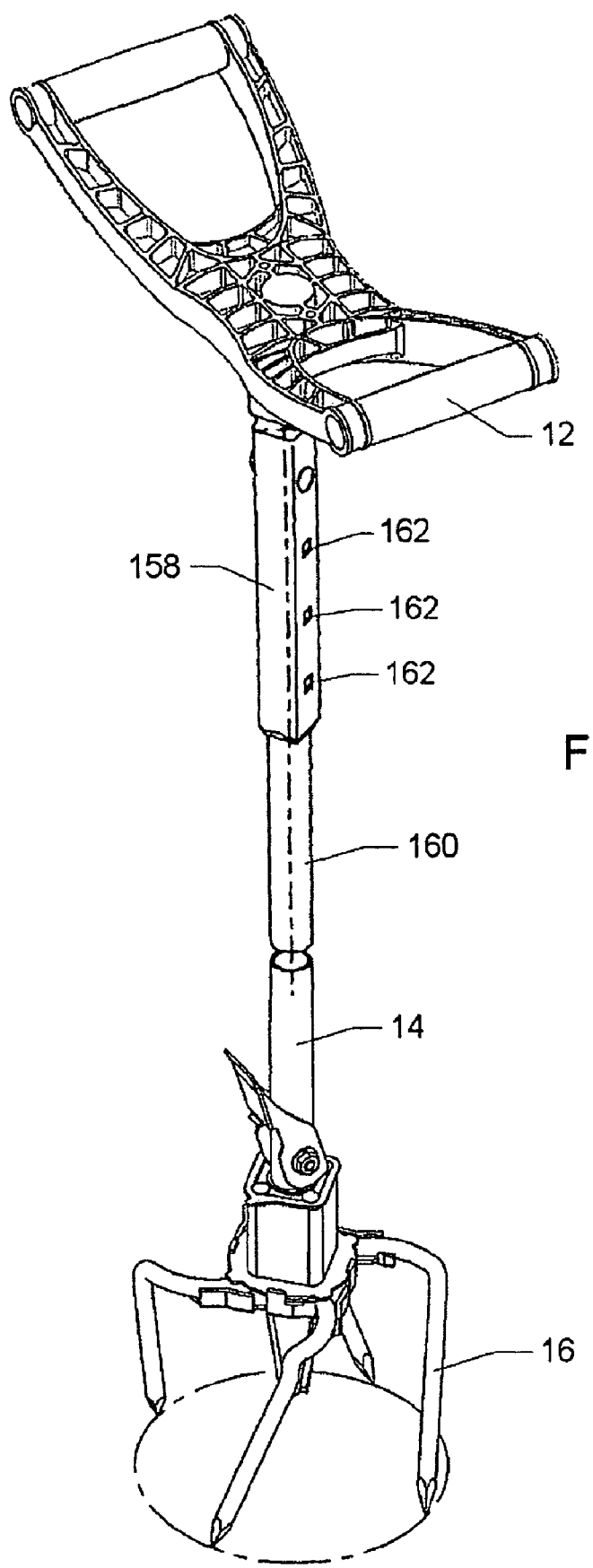
FIG. 12 shows a second alternative embodiment of the invention having a shaft adjustable in height.
Figure 13:
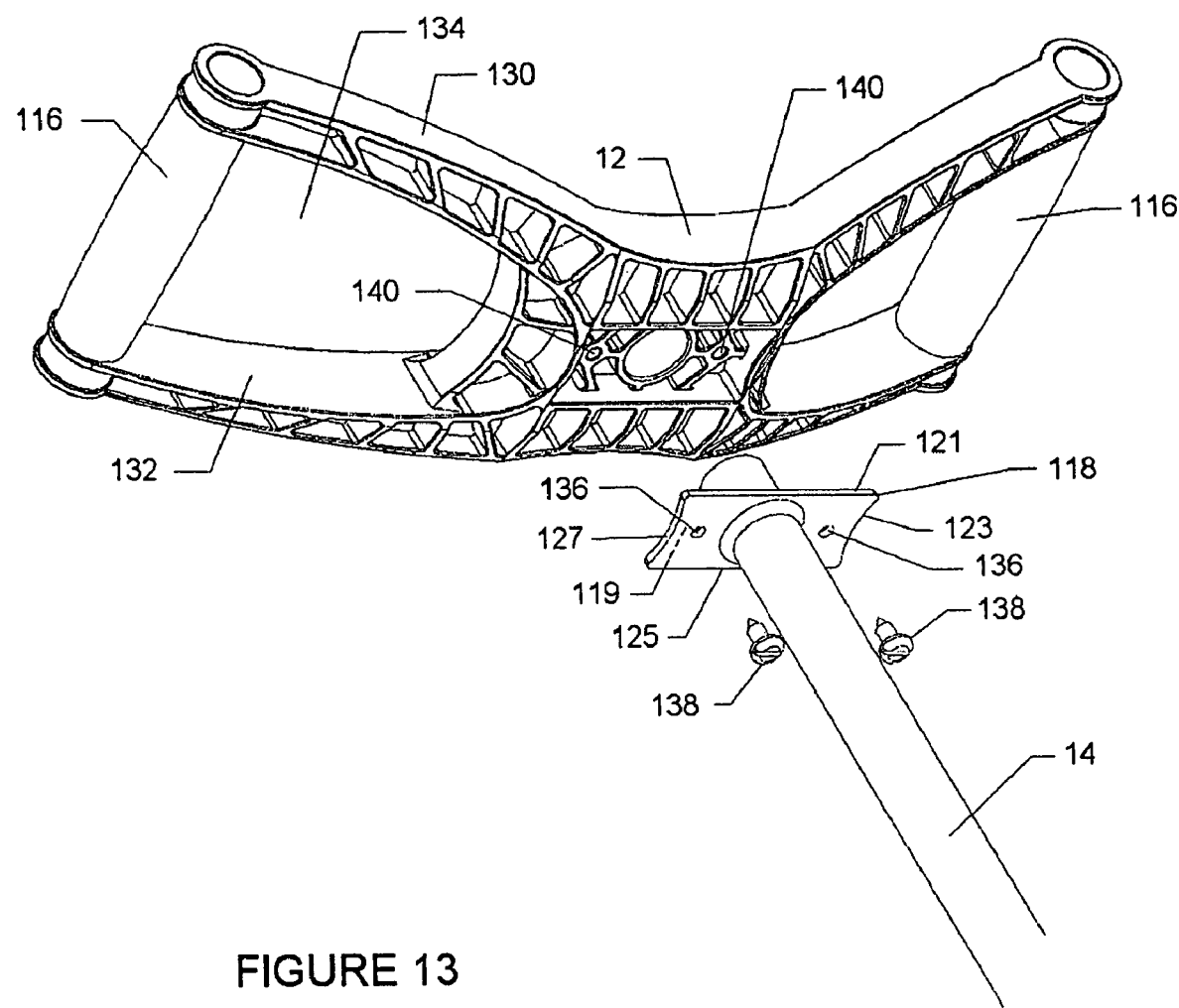
FIG. 13 is an exploded view of a handle, shaft and handle support illustrating a first mode of securing the handle and shaft.
Figure 14:
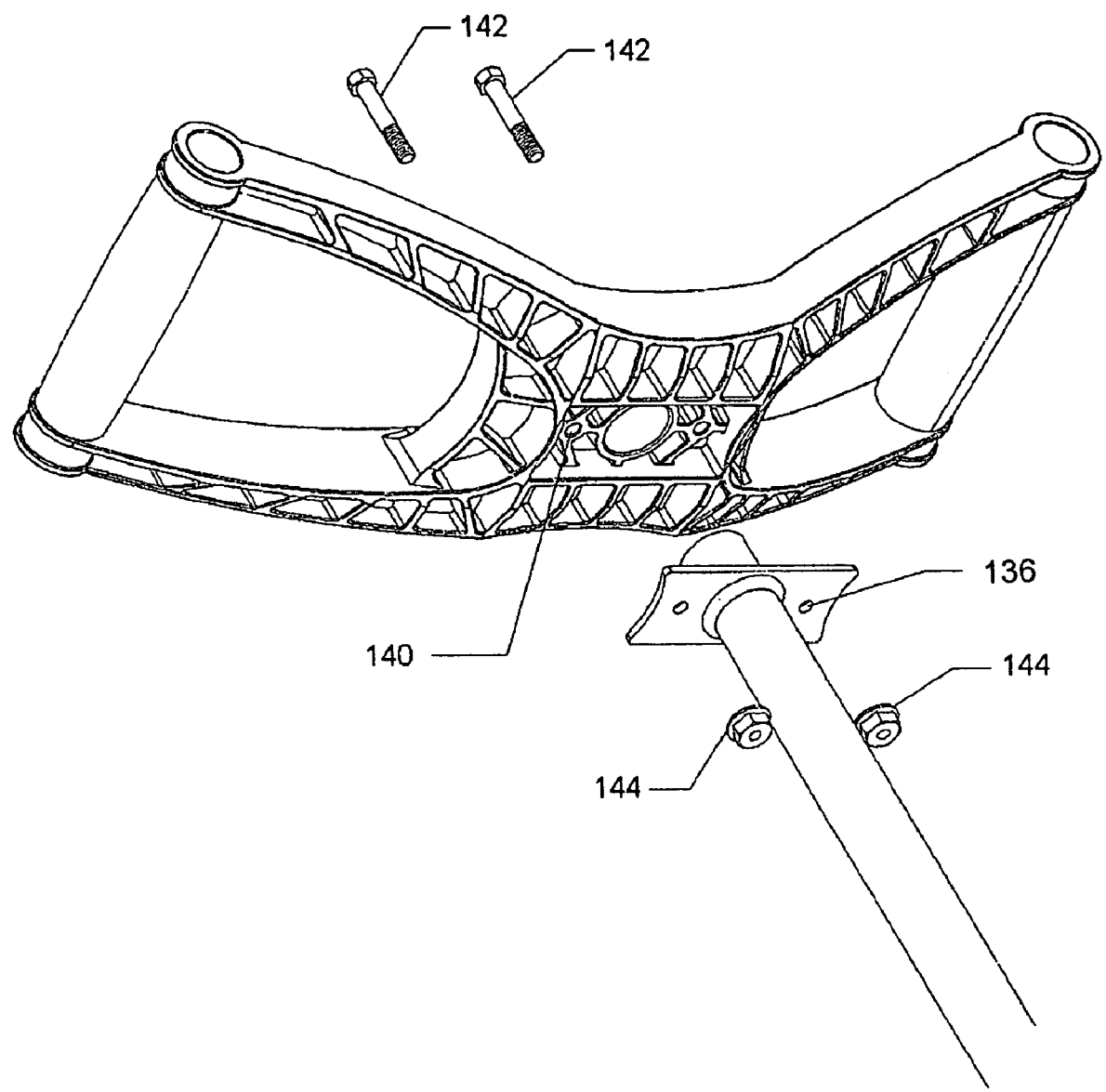
FIG. 14 is a view similar to that of FIG. 13 illustrating a second mode of securing the handle and shaft to each other.
Figure 15:
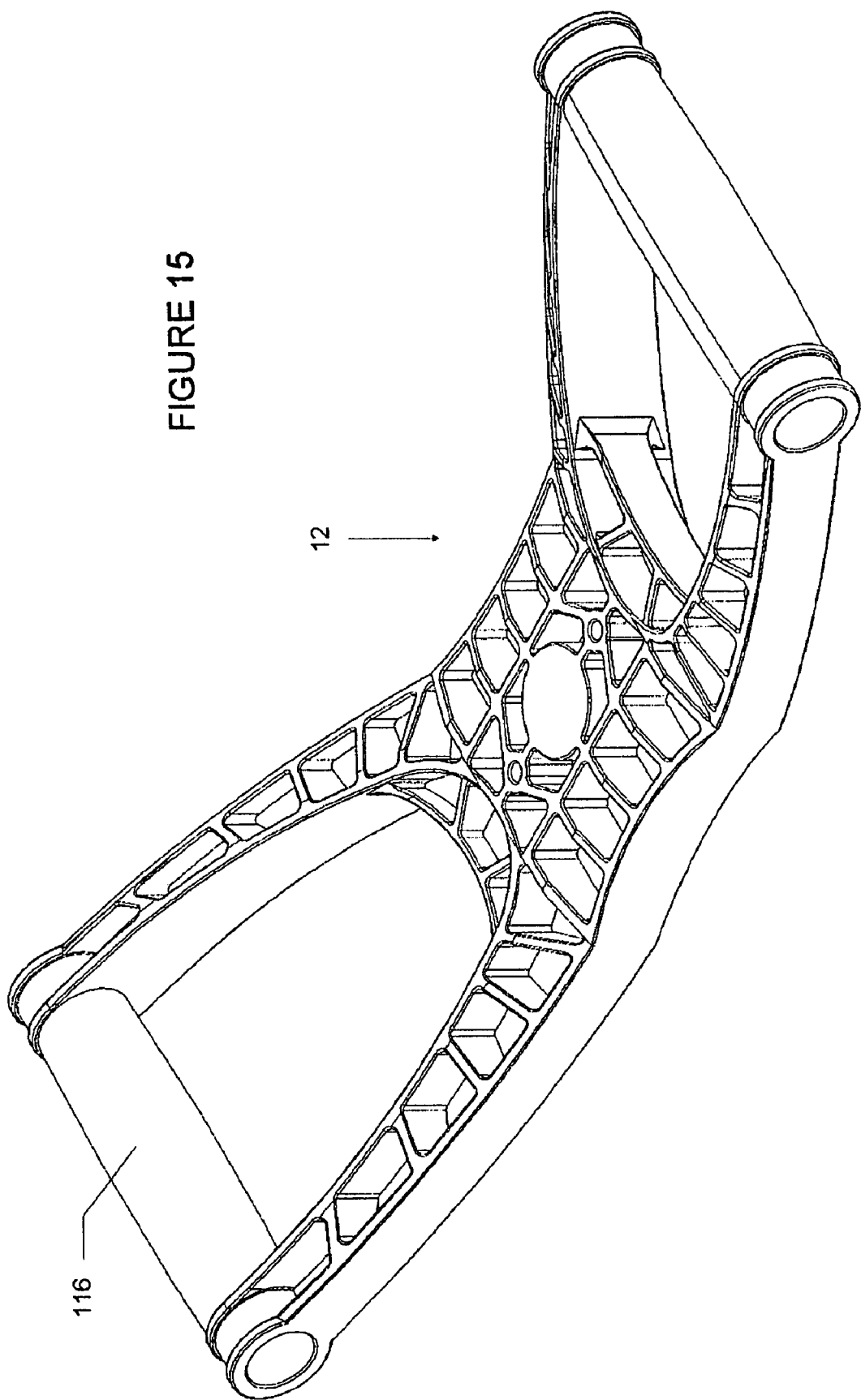
FIG. 15 is a perspective type view of the handle showing the upper side of the handle.
Figure 16:
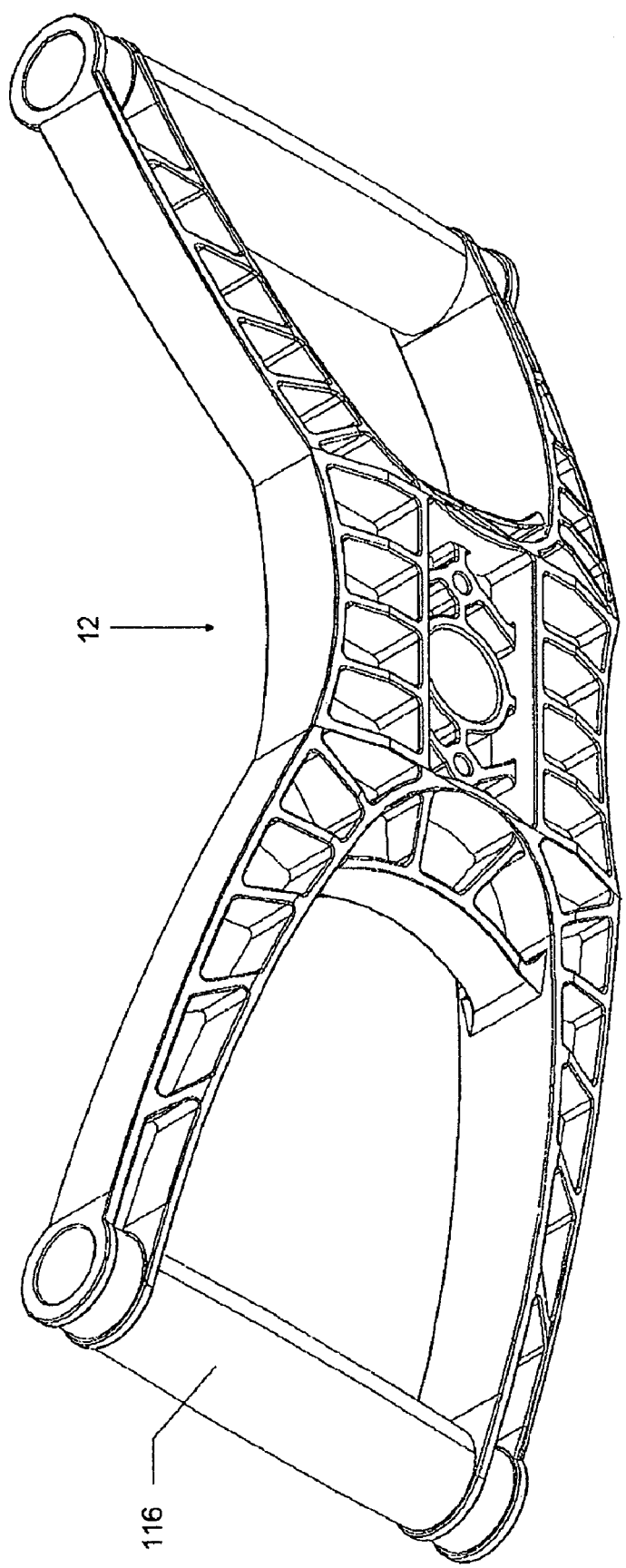
FIG. 16 is a perspective type view of the handle showing the underside of the handle.

The tool can be adjustable in height, as illustrated in the embodiments of FIGS. 11 and 12. In the FIG. 11 embodiment, the shaft includes upper portion 146 and lower portion 148. Sleeve 150 is permanently affixed, as by welding, to upper portion 146. Sleeve 150 includes spaced apart apertures 152 and there is a pair of communicating apertures in lower shaft portion 148. The user thus aligns a selected pair of apertures 152 with the apertures in the lower shaft portion, inserts bolt 154 therethrough and secures nut 156 to the bolt to set the tool to the desired height for use. In the FIG. 12 embodiment, upper shaft portion 158 is hollow, having an inner diameter sufficiently large to receive thereinto lower shaft portion 160. Upper shaft portion includes spaced apart pairs of apertures 162, which can be aligned with a pair of apertures in the lower shaft for receipt of a securing bolt therethrough, so that the overall height of the tool can be adjusted by the user much the same as in the case of the FIG. 11 embodiment.

The invention described herein presents a number of advantages over prior tools. For example, the working end of the tool can till soil between relatively closely spaced plants when the tines are in the contracted position. In the extended position, tilling larger areas of soil can be achieved to reduce the amount of time needed to work the soil. The plastic handle of the invention lowers the weight of the tool compared to a similar tool having a metal handle. An overall reduction in weight is advantageous in that it makes the tool generally easier to lift. Further, it lowers the center of gravity of the tool which can make it easier to manipulate.

All references mentioned in this specification are incorporated herein by reference in their entirety to the same extent as though the disclosure of each were specifically and individually reproduced herein in its entirety, and applicant reserves the right to incorporate any portion thereof into this specification.

Although various examples of combined elements of the invention have been described, it will also be understood that these are not intended to be exhaustive and features of one embodiment may be combined with those of another, and such other combinations are contemplated to be within the scope of the invention disclosed herein.

The terms "comprising" or "comprises" are used herein in an open-ended sense unless the context would clearly dictate otherwise. Thus, an "feature comprising A and B" includes elements A and B, but may also include other elements.

All preferred aspects of the invention known at this time to the inventor having been fully disclosed, the scope of protection sought for the invention is defined in its various aspects by the following claims.

The invention claimed is:

1. A manual garden tool comprising:
   a shaft having upper and lower ends;
   a ground-engaging implement at the lower end of the shaft for working soil by downward insertion thereinto;
   a handle secured at the upper end of the shaft, the handle comprising first and second hand grips spaced radially from the shaft and an aperture defined by sidewalls;

a support plate secured to the upper end of the shaft, the support plate has a central axis that intersects the hand grips and comprises two edges parallel to and offset from the central axis, the support plate being received within the aperture in the handle;

and wherein a lower surface of the handle abuts an upper surface of the support plate such that downward forces generated at the hand grips of the handle are distributed across the surface of the support plate and wherein at least the two edges of the support plate parallel to and offset from the central axis of the support plate are in abutment with sidewalls in the aperture of the handle such that angular forces generated at the hand grips of the handle by rotation of the tool about an axis of the shaft are distributed from the handle to the support plate at a location radially outwardly of the shaft.

2. The tool of claim 1, wherein the handle comprises a single piece of injection molded plastic.

3. The tool of claim 1, wherein the handle further comprises first and second angularly spaced apart spokes connecting first and second ends of each grip to a central handle portion which contains the aperture therein.

4. The tool of claim 3 wherein the grips are generally perpendicular to the rigid support plate.

5. The tool of claim 1, wherein all of the edges of the support plate are in abutment with side walls in the aperture in the handle.

6. The tool of claim 1, wherein the handle is removably secured to the support plate.

7. The tool of claim 1, wherein the support plate has at least four edges.

8. The tool of claim 1, wherein the support plate is generally rectangular.

9. The tool of claim 1, wherein the two edges of the support plate that are parallel to and offset from the central axis of the support plate are at least about 1.5 inches long.

* * * * *